United States Patent
Ornstein et al.

(10) Patent No.: US 7,213,035 B2
(45) Date of Patent: May 1, 2007

(54) SYSTEM AND METHOD FOR PROVIDING MULTIPLE RENDITIONS OF DOCUMENT CONTENT

(75) Inventors: David B. Ornstein, Seattle, WA (US); Ilan S. Sender, Bellevue, WA (US); Joseph King, Seattle, WA (US); Young Gah Kim, Bothell, WA (US); Jason M. Cahill, Carnation, WA (US); Keith S. Brintzenhofe, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 372 days.

(21) Appl. No.: 10/440,501

(22) Filed: May 17, 2003

(65) Prior Publication Data

US 2004/0230608 A1    Nov. 18, 2004

(51) Int. Cl.
*G06F 17/30* (2006.01)
(52) U.S. Cl. ............................ 707/104.1; 715/523
(58) Field of Classification Search ........... 707/100, 707/104.1; 715/523
See application file for complete search history.

(56) References Cited

U.S. PATENT DOCUMENTS

| | | | | |
|---|---|---|---|---|
| 6,161,114 A | * | 12/2000 | King et al. | 715/517 |
| 6,230,173 B1 | | 5/2001 | Ferrel et al. | |
| 6,457,030 B1 | * | 9/2002 | Adams et al. | 715/523 |
| 6,606,633 B1 | * | 8/2003 | Tabuchi | 707/102 |

* cited by examiner

Primary Examiner—Jeffrey Gaffin
Assistant Examiner—Monica Pyo
(74) Attorney, Agent, or Firm—Merchant & Gould P.C.

(57) ABSTRACT

Described is a mechanism for providing a single file that includes multiple representations of the same document content. Each of the representations may be optimized to provide a superior presentation for a particular device or application. The mechanism of the invention is preferably based on a compound file format that allows multiple renditions of the same content to be stored in a single document. Meta information is included within the single document that describes each of the multiple renditions together with any supporting files that may be used with those renditions. The inventors have determined that the Object Linking and Embedding (OLE) compound file format is especially well suited to implementations of the invention.

21 Claims, 8 Drawing Sheets

| R_ID (410) | FILE NAMES (412) | RULES (MIME) (414) | DESCR. (416) |
|---|---|---|---|
| 0 | Stream1; Storage1\Img1; Storage1\Img2 | text\html | Web Page |
| 1 | Stream2; Storage1\Img1; Storage1\Img3 | text\html | Web Page |
| 2 | Stream3 | .pdf | Fixed Display Version |
| 3 | | | |
| N | | | |

SYSTEM AND METHOD FOR PROVIDING MULTIPLE RENDITIONS OF DOCUMENT CONTENT

FIELD OF THE INVENTION

The present invention relates to electronic documents. More particularly, the present invention relates to a data storage format for multiple electronic documents.

BACKGROUND OF THE INVENTION

Computer users today have a wide variety of vehicles with which to view electronic documents. Desktop computers, laptop computers, pocket-sized computers, and tablet computers or just a few examples of the many different types of devices with which a user may view electronic documents. Each of these types of devices has a different form factor and displays documents slightly differently. For instance, a PDA has a very different viewable area than a monitor used with a desktop computer. The desktop computer probably has a different viewable area than the laptop computer. To compound the problem, electronic documents are created in very many different formats that may each have different viewing attributes.

Users are often presented with the problem that a particular document may display well on one device, such as a laptop computer, yet that document may not display well on another device, such as a PDA. Software developers have attempted to create a document format that is displayable on many different types of devices. For instance, a "reflowable" document representation, such as HTML, allowed for a certain amount of resizing when the window size changed without a serious detrimental impact on the layout of the document. However, using this format often hinders the document author's ability to control precisely how the document will appear. In addition, because reflowable documents are intended to be viewed somewhat well on many different devices, they do not necessarily provide an optimized viewing experience on any one device.

In contrast, formats that allow more control over how a document is displayed typically make the document applicable to a limited number of devices. For instance, a word processing document may be viewed on a desktop computer in a visually satisfactory manner. However, the word processing document, if displayed on a PDA may appear squished or otherwise inappropriate. In addition, a document created with a word processor for a particular size paper, such as letter-sized, may not print properly on another size paper, such as A4-sized.

Some document formats allow strict control over how the document is viewed by making the content of the document essentially a graphical image. One drawback of this document format is that several different versions of the entire document must be made available for each device upon which the document is intended to be viewed. In addition, the content of the fixed-format document is not editable.

SUMMARY OF THE INVENTION

The present invention is directed at a system and method for providing multiple representations of document content within a single file. Briefly stated, the invention makes use of a compound file format to contain multiple streams of data, each stream of data being a rendition of the document content. Other resources that are used by one or multiple renditions are also stored within the compound file. Meta information is stored within the compound file that describes each rendition of the document content. The meta information may also include rules that are selection criteria to assist in identifying an appropriate rendition for a given device or application.

BRIEF DESCRIPTION OF THE DRAWINGS

FIG. 4 is a tabular representation of information that may be contained within a compound file constructed in accordance with the present invention that describes each of multiple renditions within the compound file.

DETAILED DESCRIPTION OF THE PREFERRED EMBODIMENT

The invention provides a mechanism for providing a single document that include multiple representations of the same document content. Each of the representations may be optimized to provide a superior presentation for a particular device or application. The mechanism of the invention is preferably based on a compound file format that allows multiple renditions of the same content to be stored in a single document. Meta information is included within the single document that describes each of the multiple renditions together with any supporting files that may be used with those renditions. The inventors have determined that the Object Linking and Embedding (OLE) compound file format is especially well suited to implementations of the invention.

The invention will be described here first with reference to one example of an illustrative computing environment in which embodiments of the invention can be implemented. Next, a detailed example of one specific implementation of the invention will be described. Alternatives implementations may also be included with respect to certain details of the specific implementation. Finally, examples of implementations of compound files constructed in accordance with the invention are described. It will be appreciated that embodiments of the invention are not limited to those described here.

Illustrative Computing Environment of the Invention

Figure 1:
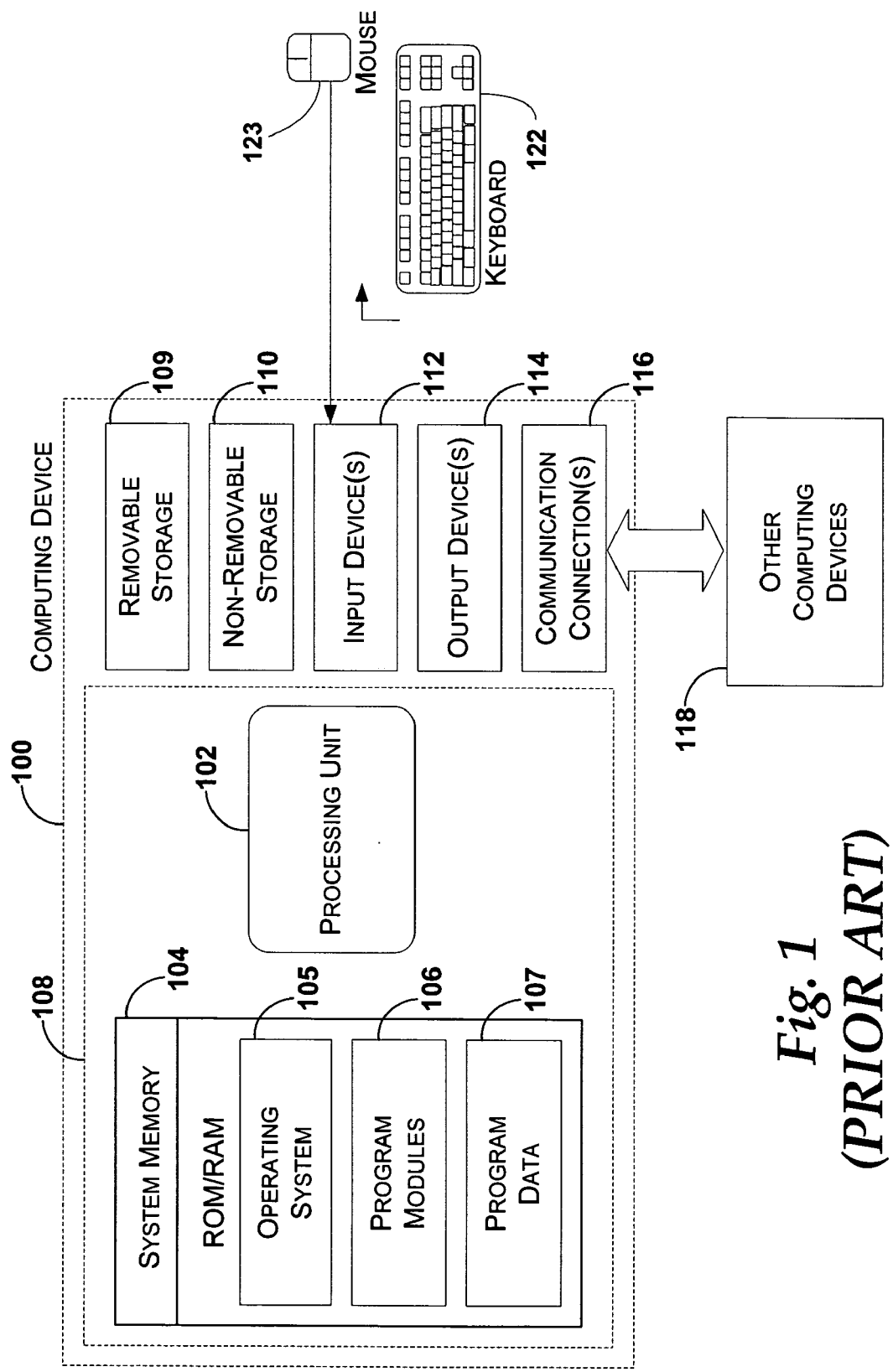
FIG. 1 is a functional block diagram that illustrates a computing device that may be used in implementations of the present invention.

FIG. 1 illustrates a computing device that may be used in illustrative implementations of the present invention. With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration of computing device 100 is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard 122, mouse 123, pen, voice input device, touch input device, scanner, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

General Discussion of Components

Figure 2:
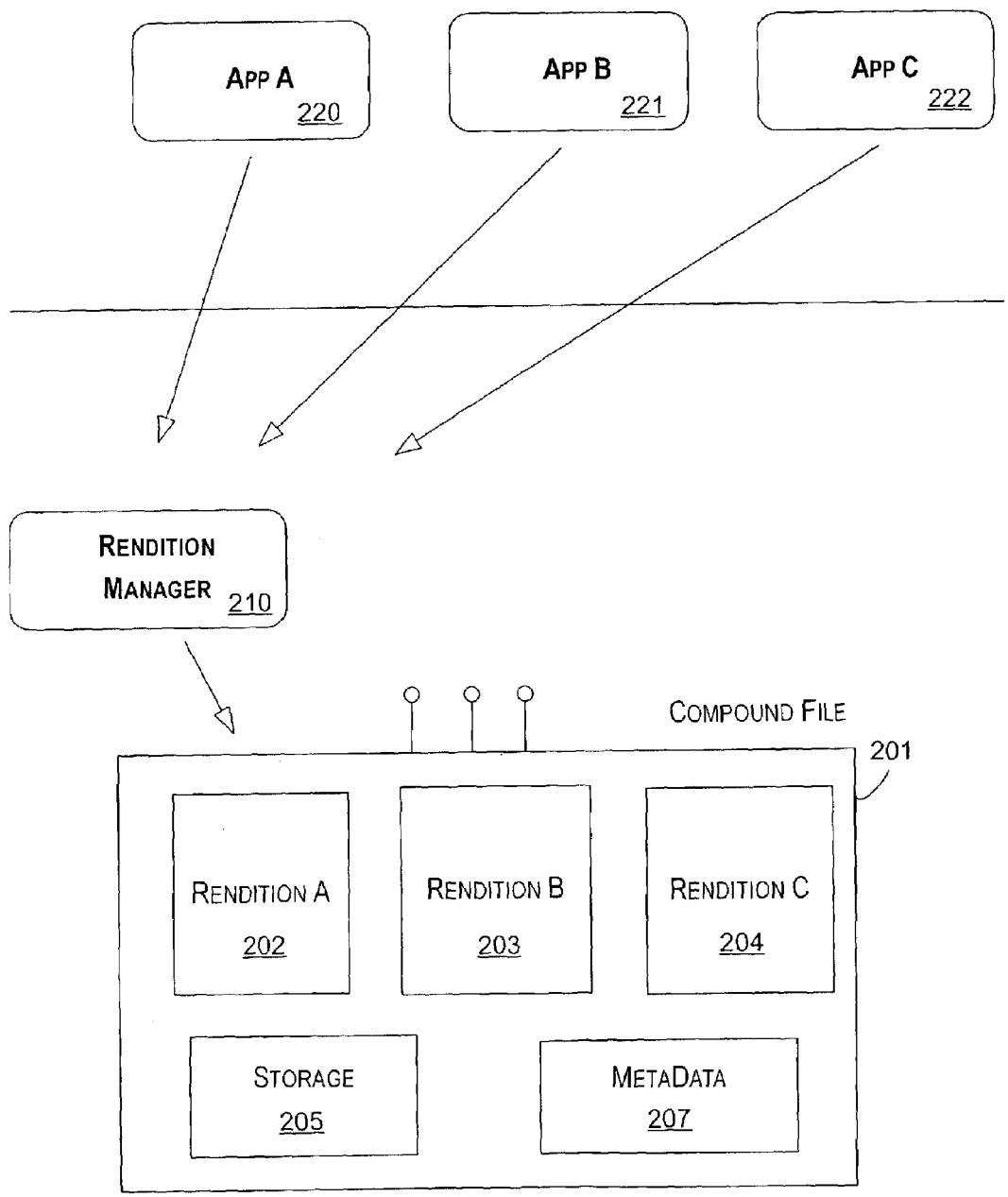
FIG. 2 is a functional block diagram generally illustrating components of a system having a compound file constructed in accordance with the present invention.

FIG. 2 is a functional block diagram generally illustrating components of an environment implementing the present invention. Illustrated are several applications 220, 221, 222, a "rendition manager" 210, and a compound file 201. Each of the applications 220, 221, 222 is configured to manipulate or display a document in a format particular to that application. For instance, application A 220 may be a word processor or the like, application B 221 may be an e-mail application capable of displaying HTML messages, and application C 222 may be a fixed-format document viewer, such as an image viewer or the like.

The compound file 201 is, preferably, an OLE compound file. The OLE document model is known in the art and is widely recognized as a mechanism for containing many disparate types of data within a single document. However, the OLE compound file is conventionally used in conjunction with the substance of a single document having embedded files or other support content that is also contained in the one OLE compound file. Importantly, each element in the compound file is stored in such a way that it can be manipulated by the application that created. The compound file 201 will be described in greater detail below in conjunction with FIGS. 3 and 4.

Briefly stated, the compound file 201 is a single file that includes multiple representations ("renditions") of particular document content. The representations may be visual or otherwise. Each rendition is "targeted for" (optimized for presentation on) a particular class of devices or media. For instance, rendition A 202 may be a word processing document, rendition B 203 may be a reflowable markup-language version of the word processing document, and rendition C 204 may be a fixed-format version of the word processing document. In addition to the multiple renditions, a storage 205 is included in the compound file 201 to contain other files or resources that may be used by one or more of the multiple renditions 202, 203, 204. Metadata 207 includes information that describes each of the multiple renditions 202, 203, 204, including which support files in the storage 205 are used in conjunction with a particular rendition.

Each rendition includes "content" (such as text and markup) and may include a collection of "resources" (such as images, fonts, and the like). Although not necessary, it is envisioned that the multiple renditions likely have different content because the markup necessary to lay out the content on different devices varies from rendition to rendition. However, the renditions may frequently refer to the same resources. It is an aspect of the invention that each shared resource appears only once in the compound file 201. Unlike some multipart document formats, the compound file 201 allows one instance of a particular resource to be contained within the storage 205 and used in conjunction with any number of the multiple renditions 202, 203, 204.

In addition, the ability to combine in a single file an editable rendition (e.g. a word processing document) with a fixed-format rendition (e.g., XAML) is an advantage of the invention over other document formats. These different file types can coexist in a multiple rendition document, and the proper rendition will be used based on multiple factors, such as software availability at consumption time or a user's intent (e.g., collaborate/edit document versus printing, or the like).

The rendition manager 210 may be an operating system service or function that is responsible for making document files available to the applications. The compound file 201 exposes standard (e.g., Component Object Model or "COM") interfaces so that each rendition may be manipulated as a whole or as individual streams. Any one or more of the applications 220, 221, 222 may open and edit the compound file 201 by requesting access to it through the rendition manager 210. The rendition manager 210 opens the compound file 201 and returns the interfaces for a particular rendition to the requesting application based on the type of the requesting application or other criteria.

Figure 3:
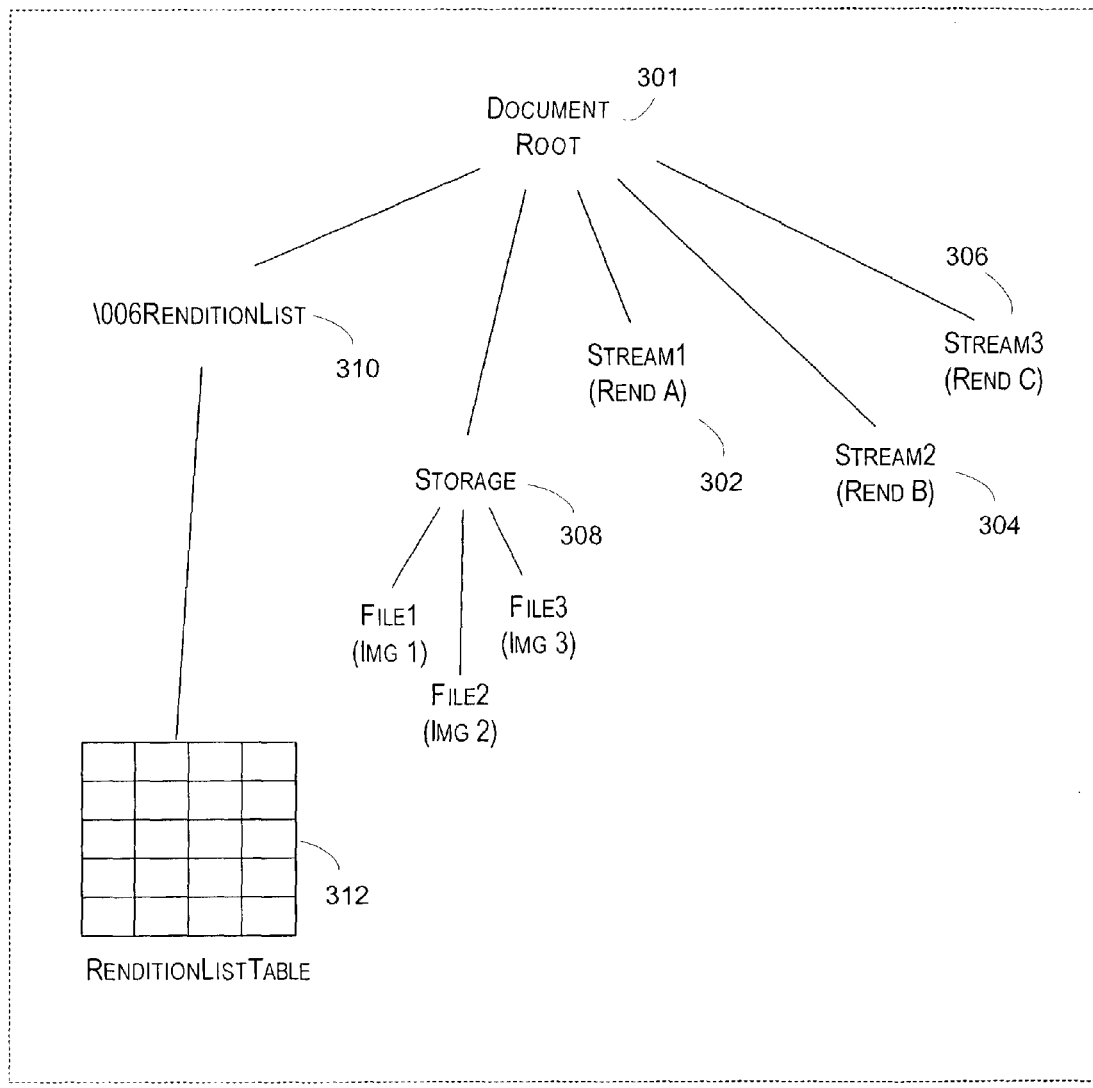
FIG. 3 is a graphical representation of a tree hierarchy that represents the compound file shown in FIG. 2.

FIG. 3 is a graphical representation of the structure of the compound file 201 represented as a tree hierarchy. Compound files are commonly considered as a "file system within a file." Within the compound file 201 is a hierarchy of "storages," which are analogous to directories in a file system, and "streams," which are analogous to files in a file system.

In accordance with the invention, the content of each rendition is placed in a separate stream or collection of streams. Thus, the data which would represent an entire document file under a conventional document format is stored in a particular stream of the compound file 201. Each resource referred to by one or more of the renditions is also placed in a separate stream. However, the several resources may be collected under a common storage.

Under the root 301 of this example hierarchy are several streams (i.e., stream 302, stream 304, and stream 306) and one storage 308. In this example, stream 302 contains a first rendition (rendition A), stream 304 contains a second rendition (rendition B), and stream 306 contains a third rendition (rendition C). In accordance with this example, each of those renditions represents a different visual representation of a document.

A special stream, named "\x0006RenditionList" 310 in this example, contains meta information about each rendition in the compound file 201. The rendition list 310 includes a table 312 that describes each of the renditions in the compound file 201. The table 312 is described below in detail in conjunction with FIG. 4. Briefly stated, the table 312 identifies each component of each rendition in the compound file 201.

FIG. 4 is a tabular representation of the information that may be stored in the rendition list 310. The rendition list 310 may be represented as a table 401 in which each row is associated with one rendition. In one embodiment, the columns in the table include a rendition ID column 410, a file names column 412, a rule's column 414, and a description column 416. What follows is a brief description of the purpose of each of those columns:

| Column name | Column description |
| --- | --- |
| Rendition ID | A textual identifier, unique among the renditions in a document but not necessarily unique across documents. Used by the APIs that create, delete, and modify renditions, to specify which rendition to operate on. An application could link to a particular Rendition ID and manipulate the several components of the rendition as an entity. |
| File Names | The list of files, streams, and/or storages (which implies everything under the storage) used in the rendition. The same stream or file name can occur in the "File Names" column of more than one row (rendition), allowing resources to be shared among renditions. The names are stored as essentially a "path" in the compound file to the subject resource. |
| Rules | Used by APIs which automatically select a rendition to display based on characteristics of the device on which the document is being viewed or other criteria. In a simple implementation, the rules column may include a MIME-type for the first file identified in the file names column. |
| Description | A human-readable description of the rendition, e.g., "Fixed-format rendition for 8-1/2 × 11 paper". Intended to be displayed to the end-user to describe what renditions a compound file contains, or to select a rendition to display. The description may be stored in any language, such as the local language of the user. |

The format of the rendition table allows one stream in each rendition to be designated as a "start stream" for the rendition. When that rendition is requested, the start stream is the first stream to be presented.

Special notice should be made about the Rules information. As noted, the information in the Rules column is intended to enable a decision about which rendition to return to a particular application. Accordingly, the rules information may be as simple as a MIME-type associated with a particular file of the rendition, such as the first file identified in the file names column. In this case, a process could walk the list of renditions searching for a MIME-type that is compatible with the particular requesting application. Other identifiable characteristics could equally serve as the selection criteria, such as a logical resolution and geometry, a color depth, a human language, or reader visual ability classification.

Alternatively, the selection criteria included in the rules column may be relatively sophisticated. For instance, a reference could be included in the rules column that points to code either in the compound file or elsewhere that assists in the selection process. In addition, more complex information could be included in the rules column that describes each rendition in a way sufficient to assist a particular application or the rendition manager 210 identified the appropriate rendition. These and other alternatives will become apparent to those skilled in the art.

Discussion of Particular Examples of the Invention

Particular implementations of the invention will now be described though example with reference to FIGS. 5 and 6, which together illustrate how the invention may be used to create a compound file to be used with a document reader type of application (FIG. 5) and for a word processing type of application.

Figure 5:
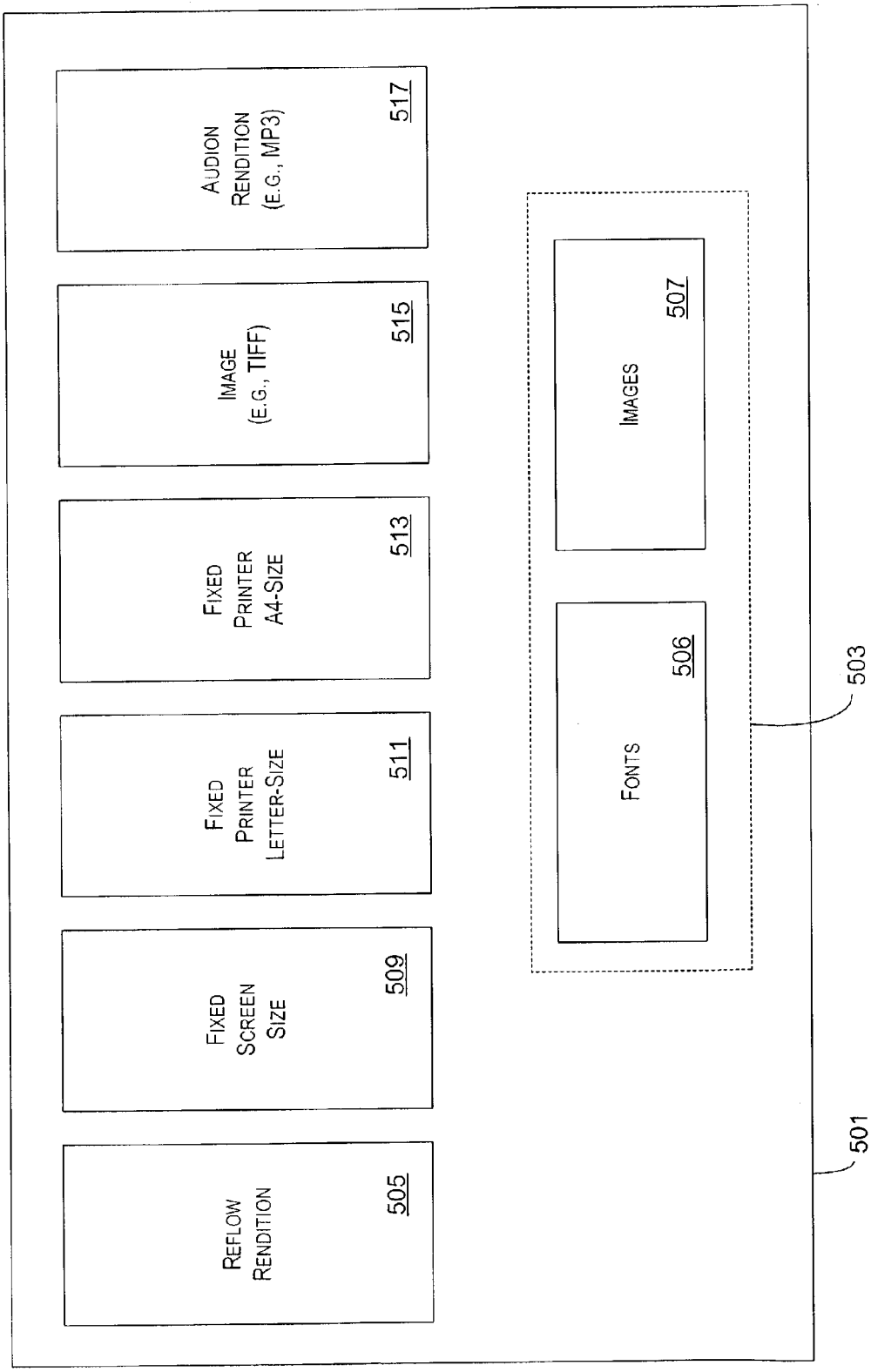
FIG. 5 is a graphical illustration of one particular example of a compound file having several streams and one storage, in accordance with one implementation of the invention.

FIG. 5 is a graphical illustration of one particular example of a compound file 501 having several streams and one storage 503. In this example, the compound file 501 includes six different renditions of the same document substance. A reflow rendition 505 is included that represents the document substance in a manner that is resizable according to the particular display device. The reflow rendition 505 includes markup language and the like that may refer to particular fonts 506 or images 507. Accordingly, those fonts 506 or images 507 are stored in one or more separate streams that are contained within the storage 503.

A screen-sized fixed rendition 509 is also included that may be designed for display on a particular screen size. For instance, the screen-sized fixed rendition 509 may be of a fixed size that displays properly on a monitor having a resolution of 800 pixels by 600 pixels. Alternatively, the screen-sized fixed rendition 509 may be sized for display on a small, such as a pocket-sized, handheld device.

Two renditions are included and are fixed-sized for particular computer printers. For instance, a letter-sized rendition 511 includes a version of the document substance that is fixed-format and prints properly on letter-sized paper. An A4-sized rendition 513 includes a version of the document substance that is fixed-format and prints properly on A4-sized paper. As mentioned, the two printer renditions may also reference the resources within the storage 503.

The compound file 501 may also include an image rendition 515 of the document substance and an audio representation 517 of the document substance. For example, the document substance may be the contents of a book, in which case the image rendition 515 may be a photograph of pages of the book, and the audio representation 517 may be an audible narration of the contents of the book. It will be appreciated that the renditions need not necessarily be limited to visual representations of the same contents.

Figure 6:
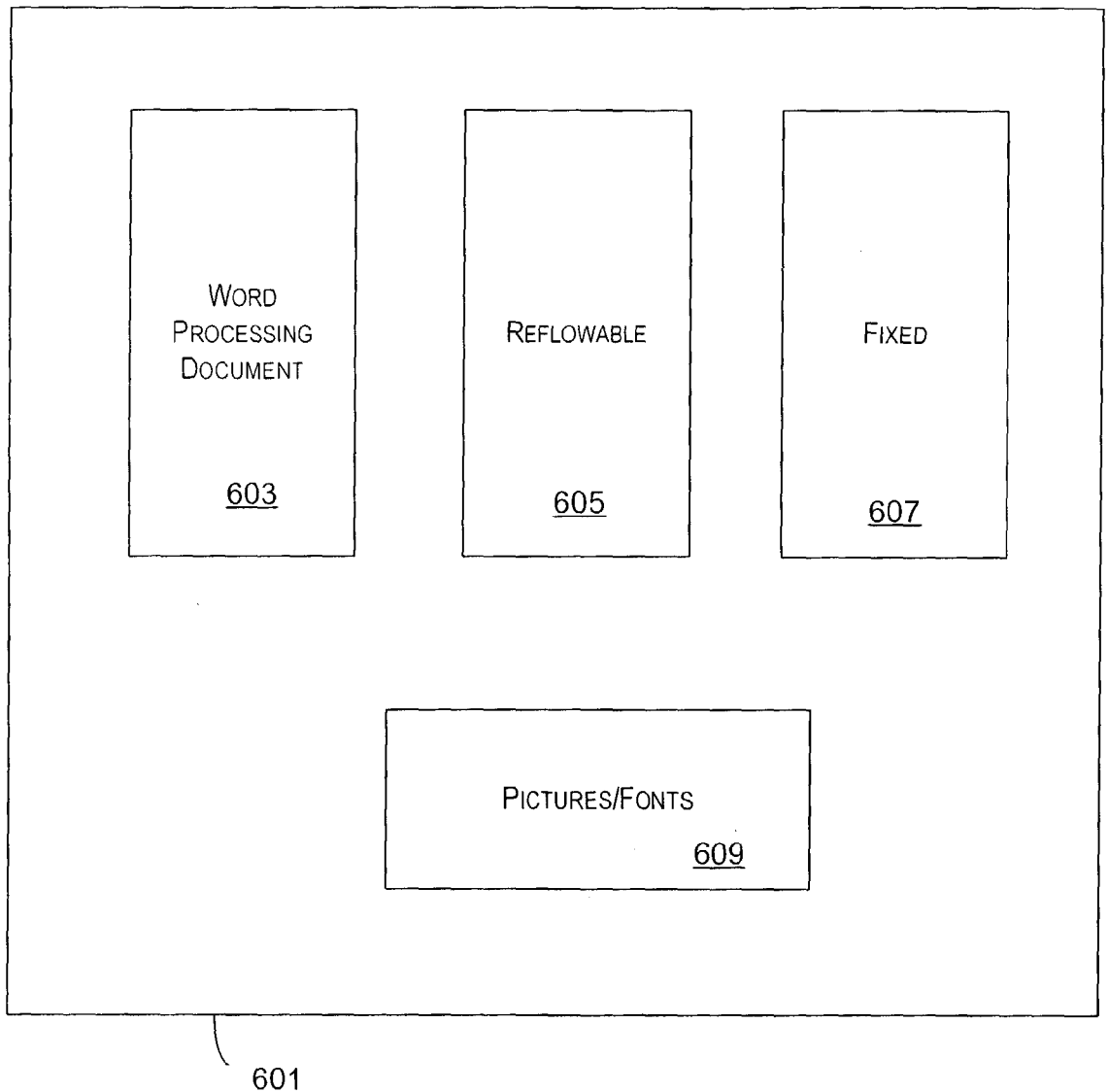
FIG. 6 is a graphical illustration of another example of a compound file having several streams, in accordance with one implementation of the invention.

FIG. 6 is a graphical illustration of another example of a compound file 601 having several streams. In this example, the compound file 601 includes a word processing stream 603, a reflow stream 605, and a fixed-format stream 607. In this instance, the word processing stream 603 may have embedded pictures and fonts that are stored in the compound file 601 in a common resource stream 609. The rendition list (not shown) for this particular example could then include rendition information that allows a particular rendition two reference portions of the resource stream six or nine. This could be achieved by using sub-stream references when identifying the files in the file names portion of the rendition list.

Figure 7:
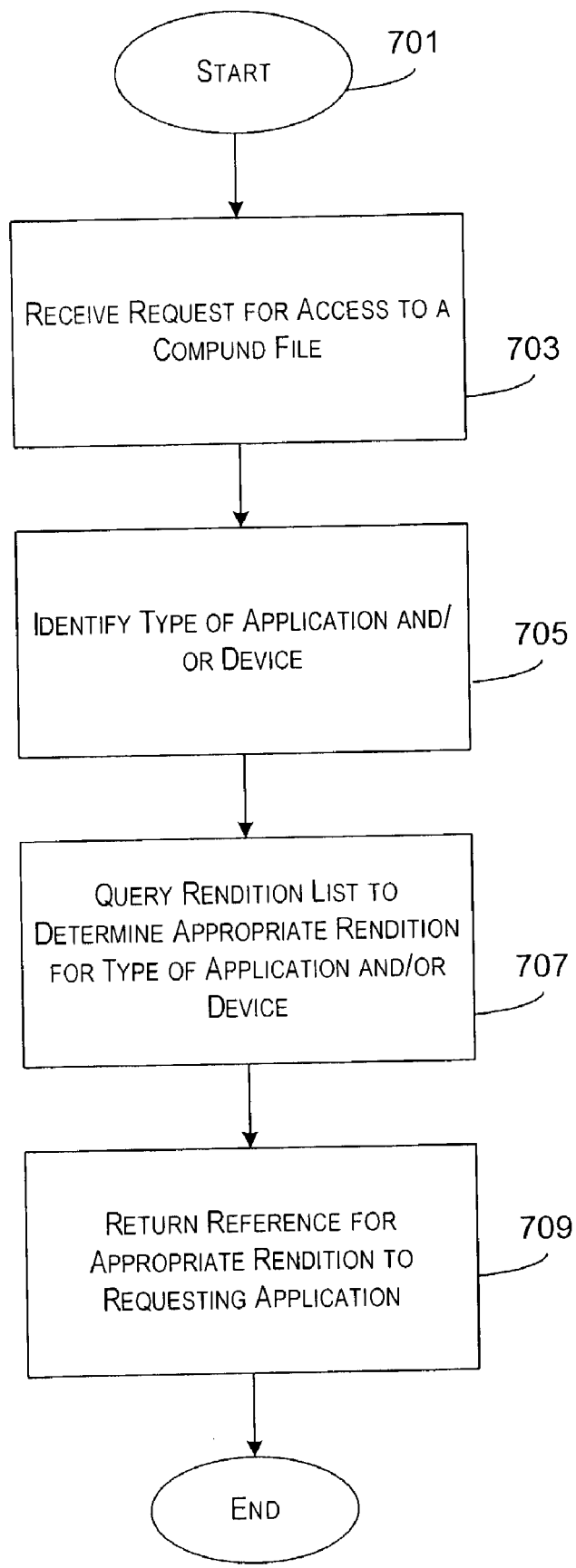
FIG. 7 is a logical flow diagram generally illustrating a process for making an appropriate rendition within a compound file available to a requesting application, in accordance with the invention.

FIG. 7 is a functional block diagram generally illustrating steps of a process for making multiple renditions of a document available through a compound file. The process 700 begins at starting block 701 where a compound file exists that includes multiple representations of similar document content.

At block 703, a request is received for access to the compound file. The request may identify a particular requesting application and include information useful in determining an appropriate rendition, such as particular format supported by the application, and the like.

At block 705, the particular type of application, as well as other criteria, is identified from the request. Any additional information necessary for identifying the appropriate rendition may be queried from the application or some other source. For instance, the particular type of device (e.g., a pocket-sized computer or a desktop computer) upon which the compound file resides may be queried.

At block 707, a rendition list associated with the compound file is queried to determine the appropriate rendition for the application. As discussed in detail above, the rendition list may be queried to identify a particular rendition having a MIME-type that is consistent with the application. Alternatively, the rendition list may include a set of rules or conditions that may be applied or compared to the criteria associated with the application.

At block 709, a reference (e.g., a set of interfaces) for the appropriate rendition is returned to the requesting application. At this point, the requesting application can manipulate the rendition as an entity. The requesting application is presented with a representation of the document content that is intended for the application or the particular device.

Figure 8:
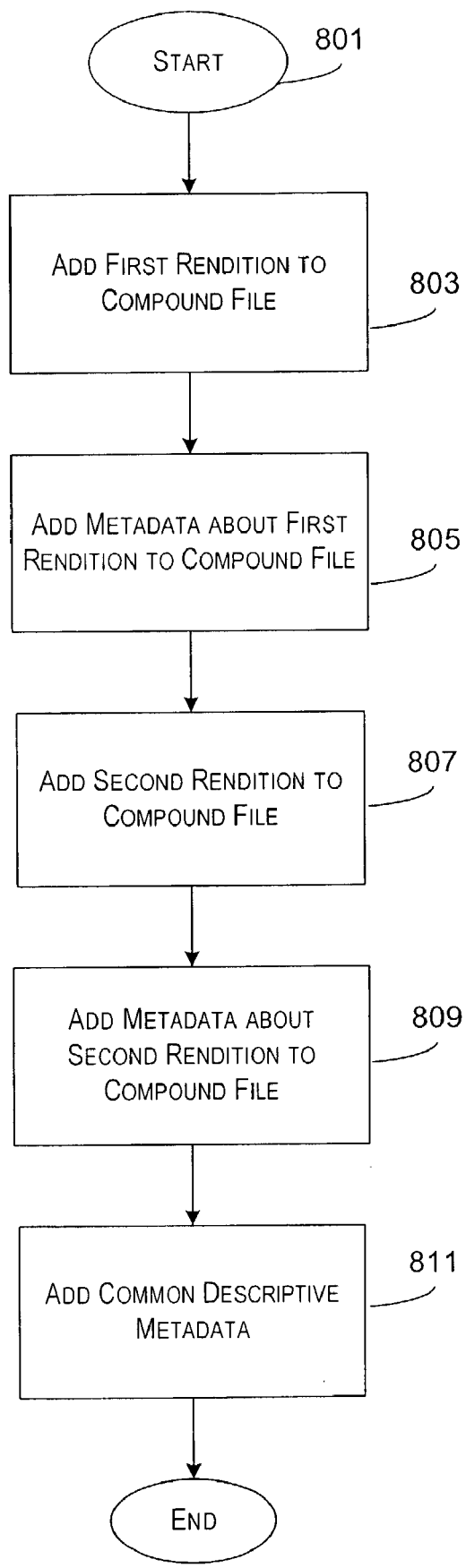
FIG. 8 is a logical flow diagram generally illustrating a process for creating a multiple rendition compound file, in accordance with the invention.

FIG. 8 is a logical flow diagram generally illustrating a process for creating a multiple rendition file, in accordance with the invention. The process 800 begins at starting block 801, where an application or applications have created multiple renditions of document content and are preparing to write the multiple renditions to a compound file.

At block 803, an instruction is issued to add a first rendition to the compound file. The first rendition may be a visual representation of the document content in editable form, such as a word processing document. Similarly, the first rendition may be in any one of many other representations of the document content.

At block 805, metadata about the first rendition is added to the compound file. As stated above, the metadata may reside under a rendition list stream of the compound file. The metadata describes the first rendition, including any files that may be a part of the first rendition. The metadata may also include rules or selection criteria to enable the selection of an appropriate rendition based on a requesting application.

At block 807, a second rendition is added to the compound file. The second rendition may also be a visual representation of the document content, or it may be some other form, such as an audible representation or image representation.

At block 809, metadata about the second rendition is added to the compound file. Again, the metadata describes the second rendition, including any files that may be a part of the second rendition. The metadata may also include rules or selection criteria to enable the selection of an appropriate rendition based on a requesting application.

At block 811, common descriptive metadata is added to the compound file, such as information about the author of the document or other rendition-neutral information about the document or the compound file. At this point, the compound file includes two complete renditions, which may or may not share resources. This compound file may now be manipulated using a process similar to the one described above in conjunction with FIG. 7.

The above specification, examples and data provide a complete description of the concepts and illustrative implementations of the invention. Since many embodiments of the invention can be made without departing from the spirit and scope of the invention, the invention resides in the claims hereinafter appended.

We claim:

1. A computer-readable storage medium having computer-executable components, comprising:
   receiving an instruction from a requesting application for a rendition of a document; and
   providing the requesting application with the rendition of the document that is selected from a single file including:
   a document root;
   a first stream consisting of a first rendition of the document that is targeted for a first media; wherein the first stream is a child of the document root and wherein the first rendition is created before receiving the instruction from the requesting application for the rendition of the document;
   a second stream consisting of a second rendition of the document that is targeted for a second media, wherein the second stream is a child of the document root and wherein the second rendition is created before receiving the instruction from the requesting application for the rendition of the document; and
   a third stream including information that describes the first rendition and the second rendition, the information including an identification for each rendition of a start stream associated with each rendition; wherein the third stream is a child of the document root; and wherein only one of the first stream and the second stream is provided to the requesting application.

2. The computer-readable medium of claim 1, further comprising a fourth stream including a resource that is shared by the first rendition and the second rendition.

3. The computer-readable medium of claim 1, wherein the first rendition comprises a first visual representation of the document.

4. The computer-readable medium of claim 3, wherein the second rendition comprises a second visual representation of the document.

5. The computer-readable medium of claim 1, wherein the first rendition comprises an audible representation of the document.

6. The computer-readable medium of claim 1, wherein the information comprises a plurality of rendition entries, each rendition entry having at least a rendition identifier and a files identifier, the rendition identifier being operative to uniquely identify a particular rendition with which the rendition entry is associated, and the files identifier being operative to identify each file associated with the particular rendition.

7. The computer-readable medium of claim 6, wherein each rendition entry further comprises at least a rules entry that includes criteria useful for determining which rendition is appropriate for a particular device or application.

8. The computer-readable medium of claim 7, wherein each rendition entry further comprises at least a description entry that includes human-readable information associated with the particular rendition.

9. A computer-implemented method, comprising:
receiving an instruction from a requesting application, the instruction being related to content of a document;
accessing a single file that includes multiple renditions of the document wherein each of the multiple renditions are created before receiving the instruction from the requesting application, and; wherein each of the multiple renditions is stored in a separate stream; wherein a first stream consists of a first rendition of the document that is targeted for a first media; wherein a second stream consists of a second rendition of the document that is targeted for a second media, wherein a third stream includes information that describes the multiple renditions, the information including an identification for each rendition of a start stream associated with each rendition;
analyzing meta information that is contained within the single file to determine an appropriate rendition from one of the multiple renditions that has already been created and that is appropriate for the requesting application; and
providing the appropriate rendition available to the requesting application.

10. The computer-implemented method of claim 9, wherein each of the multiple renditions of the document content are targeted for a different media.

11. The computer-implemented method of claim 10, wherein analyzing the meta information comprises querying data about the multiple renditions to determine selection criteria for use in identifying the appropriate rendition.

12. The computer-implemented method of claim 11, wherein the selection criteria comprises a characteristic for each of the multiple renditions.

13. The computer-implemented method of claim 12, wherein the characteristic comprises at least one selected from a group comprising a MIME-type, a logical resolution and geometry, a color depth, a human language, and a reader visual ability classification.

14. The computer-implemented method of claim 11, wherein the selection criteria comprises rules for using a particular rendition in conjunction with a particular application or device.

15. The computer-implemented method of claim 9, wherein the multiple renditions comprise at least one visual representation of the document content.

16. The computer-implemented method of claim 15, wherein the multiple renditions further comprise at least one other representation of the document content.

17. The computer-implemented method of claim 16, wherein the other representation of the document content comprises an audible representation of the document content.

18. A computer-readable storage medium encoded with a data structure, comprising:
a first stream including document content presented in a first representation that was created before receiving the instruction from the requesting application for the rendition of the document; a second stream including the document content presented in a second representation that was created before receiving the instruction from the requesting application for the rendition of the document; and a third stream including information that describes the first representation and the second representation, the information including an identification for each representation of a start stream associated with each representation; wherein only one of the first stream and the second stream is accessed in response to receiving an instruction from a requesting application for a rendition of a document;
a storage containing resources referenced by the document content; and
a table that describes a first rendition of a document including the first stream and resources, and that describes a second rendition of the document including the second stream and the resources, wherein only one of the first rendition and the second rendition are made available to a requesting application.

19. The computer-readable medium of claim 18, wherein the table includes information about each rendition including an identifier for each rendition and a list of files associated with each rendition.

20. The computer-readable medium of claim 19, wherein the table further includes selection criteria for associating a particular rendition with a particular application or device.

21. The computer-readable medium of claim 18, wherein the data structure further comprises an interface for manipulating the first rendition as an entity.

* * * * *